US012642742B2

(12) United States Patent
Halderson

(10) Patent No.: US 12,642,742 B2
(45) Date of Patent: Jun. 2, 2026

(54) DEVICE, SYSTEM, AND METHOD FOR SELF DRY NEEDLE FOR PAIN OR DISCOMFORT

(71) Applicant: Dry Needling Innovation Systems, LLC, Holmen, WI (US)

(72) Inventor: Dana Halderson, Holmen, WI (US)

(73) Assignee: Dry Needling Innovation Systems, LLC, Holmen, WI (US)

( * ) Notice: Subject to any disclaimer, the term of this patent is extended or adjusted under 35 U.S.C. 154(b) by 108 days.

(21) Appl. No.: 18/422,639

(22) Filed: Jan. 25, 2024

(65) Prior Publication Data

US 2024/0207137 A1 Jun. 27, 2024

Related U.S. Application Data

(63) Continuation-in-part of application No. 18/391,049, filed on Dec. 20, 2023, now abandoned, which is a continuation-in-part of application No. 18/367,897, filed on Sep. 13, 2023, now abandoned.

(60) Provisional application No. 63/407,931, filed on Sep. 19, 2022.

(51) Int. Cl.
*A61H 39/08* (2006.01)
*A61H 39/00* (2006.01)

(52) U.S. Cl.
CPC ......... *A61H 39/086* (2013.01); *A61H 39/002* (2013.01); *A61H 2201/165* (2013.01); *A61H 2205/06* (2013.01); *A61H 2205/10* (2013.01)

(58) Field of Classification Search
CPC .. A61H 39/086; A61H 39/08; A61B 17/3403; A61B 2017/3407; A61B 2017/3411
See application file for complete search history.

(56) References Cited

U.S. PATENT DOCUMENTS

| | | | | | |
|---|---|---|---|---|---|
| 5,375,588 | A * | 12/1994 | Yoon | A61B 17/3462 606/1 |
| 6,004,304 | A * | 12/1999 | Suzuki | A61H 39/086 604/272 |
| 6,022,368 | A | 2/2000 | Gavronsky et al. | |
| 2006/0206164 | A1* | 9/2006 | Gavronsky | A61N 1/0502 607/46 |
| 2008/0058915 | A1* | 3/2008 | Chang | A61H 39/02 607/140 |
| 2013/0345782 | A1* | 12/2013 | Kambouris | A61N 1/328 607/116 |
| 2014/0039658 | A1* | 2/2014 | Bangera | A61B 17/3403 700/98 |
| 2020/0179618 | A1* | 6/2020 | Jandali | A61K 38/164 |
| 2021/0016104 | A1* | 1/2021 | Cavanaugh | A61B 17/3403 |
| 2021/0022959 | A1 | 1/2021 | Li et al. | |
| 2022/0000714 | A1* | 1/2022 | Lin | A61H 39/086 |
| 2022/0296465 | A1* | 9/2022 | Tsai | A61H 39/06 |

* cited by examiner

*Primary Examiner* — Brigid K Byrd
(74) *Attorney, Agent, or Firm* — Westman, Champlin & Koehler, P.A.; Amanda M. Prose

(57) ABSTRACT

Device, system, and method for dry needling comprising a device having a surface area configured to surround a location on a user, one or more openings in the surface area, each opening supporting a directional needle guide configured to allow a needle to pass therethrough to the location on the user; and one or more needles configured to fit within each directional needle guide.

19 Claims, 10 Drawing Sheets

DEVICE, SYSTEM, AND METHOD FOR SELF DRY NEEDLE FOR PAIN OR DISCOMFORT

CROSS-REFERENCE TO RELATED APPLICATION

This application is a continuation in part of application Ser. No. 18/391,049 filed Dec. 20, 2023, which is a continuation in part of application Ser. No. 18/367,897, filed Sep. 13, 2023, and claims priority to and the benefit of U.S. provisional patent application Ser. No. 63/407,931, filed Sep. 19, 2022, the contents of which are incorporated herein in their entirety.

BACKGROUND

Musculoskeletal pain results from repetitive movement or injury to a body part such as the forearm, shoulder, thigh, lower leg and/or foot. This causes pain and discomfort, and disrupts the activities of a person's daily life.

A scar (or scar tissue) is an area of fibrous tissue that replaces normal skin after an injury. Scars result from the biological process of wound repair in the skin, as well as in other organs, and tissues of the body. Similarly, injuries or other conditions affecting the epidermis, dermis and/or subcutaneous tissue as well as muscle tissue can cause physical and emotional discomfort and also disrupt the activities of a person's daily life. Dry needling is a method of relieving pain associated with repetitive movements and/or other injury. Generally, dry needling is carried out by physical therapists or other clinicians and is done in-office. Clinicians use dry needling to resolve musculoskeletal pain.

Because healthcare system clinicians currently perform dry needling, limited access to healthcare and high costs prevent many people from obtaining such services.

SUMMARY

An aspect of the present disclosure relates to a system for dry needling comprising a device having a surface area configured to surround a location on a user, one or more openings in the surface area, each opening supporting a directional needle guide configured to allow a needle to pass therethrough to the location on the user; and one or more needles configured to fit within each directional needle guide.

The surface area comprises a flexible material, fabric, or plastic and is configured to removably surround the location on the user.

In one or more embodiments the surface area is a sleeve configured to surround an arm, leg, or other appendage of the user.

The sleeve is a pull-device of unitary construction or is a wrap sleeve that can be secured around the location of the user with closures of clasps, clips, hook and loop fastener or combinations thereof.

The openings in the surface area correspond to one or more muscle locations on the user such that when one of the one or more needles is inserted into each directional guide the needle is in a position to penetrate the user into the muscle tissue.

The user is able to self-administer the needles.

The sleeve is custom fit to the user and the locations of each of the one or more openings are custom positioned.

Another aspect of the present disclosure relates to a method of self-needling comprising providing device with one or more needle guides thereon wherein the device is fit to the user by a medical professional and the locations of the needle guides are customized to the user's anatomy. Needles are provided for insertion into the user's anatomy through the device and the needle guides by the user.

Yet another aspect of the present disclosure relates to a method of self-administering therapeutic dry needling comprising donning a sleeve on a selected body location and inserting one or more needles through one or more corresponding needle guides held by one or more corresponding apertures in the sleeve. The one or more needle guides are secured to one or more target locations on the sleeve wherein the target locations correspond to muscle locations on the selected location of the user such that the needles are inserted through the needle guide and into the selected muscle there below. The sleeve has dimensions specific to hold the sleeve and one or more needle guides on the selected location on the user while inserting the one or more needles through the one or more needle guides.

Separating the one or more needle guides from the sleeve allows for washing or sanitizing the one or more needle guides and/or the sleeve.

The sleeve and the one or more needle guides are comprised of different materials.

Self-administering dry needling further includes leaving the one or more needles inserted in the selected muscle through the one or more corresponding needle guides and protecting the one or more needles from unintentional movement or dislodgement by an upright surface of the one or more corresponding needle guides.

The needles may be retained penetrated into the muscle a selected period of time ranging from about 1 second to about 10 minutes.

Yet another aspect of the present disclosure relates to a system for dry needling comprising a device comprising one or more surface areas configured to attach to a selected location on a user, one or more openings in the one or more surface areas, each opening configured for supporting a needle passing therethrough and into the selected location on the user.

In one or more embodiments an adhesive layer on the device is configured to removably secure the device to the selected location.

In one or more embodiments, the one or more openings in the one or more surface areas each support a directional needle guide for supporting the needle passing through the device and into the selected location on the user.

In one or more embodiments, the one or more openings in the one or more surface area are apertures designed to frictionally engage a location on a needle inserted therethrough and the device having a foam layer thickness configured to hold the needle inserted therethrough and into the selected location on the user.

In any one or more of the aspects herein, the device or system further comprises a source of electrical pulses and one or more wires for electrically coupling the source of electrical pulses to one or more needles inserted into the selected location on the user for providing electrical stimulation to the selected location.

In one or more embodiments described herein the target or treatment locations correspond to a muscle or muscle group, scar or scar tissue, incision site, wound, a dermal trauma injury, a neural tissue trauma injury, muscular trauma injury, contracture, stretch marks, connective tissue, or combinations thereof.

DETAILED DESCRIPTION

Figure 1:
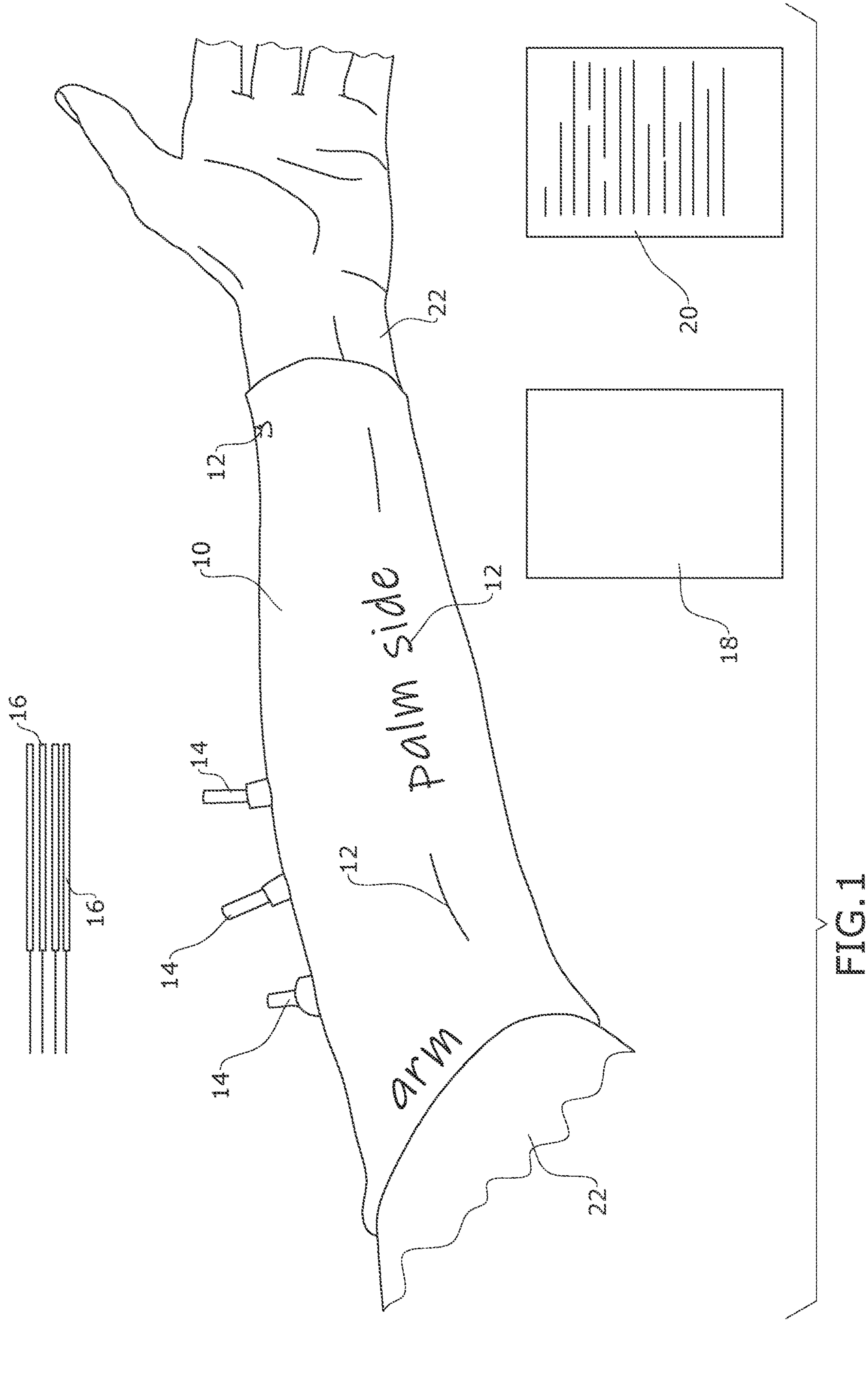
FIG. 1 illustrates a system with a device according to one or more embodiments described herein.
Figure 2B:
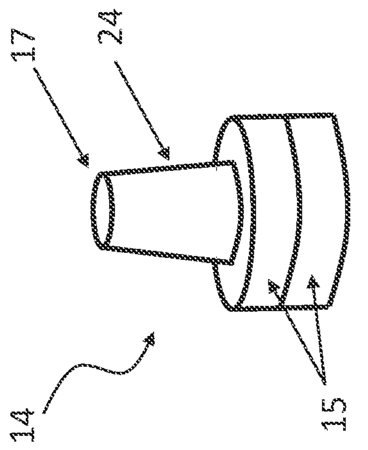
FIGS. 2A-2D illustrate embodiments of needle guides of the device.
Figure 2A:
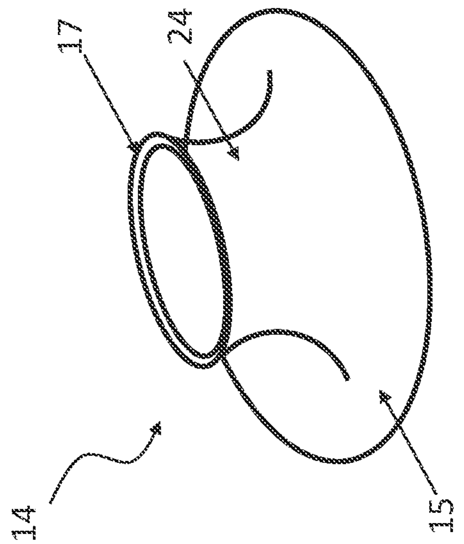
Figure 2D:
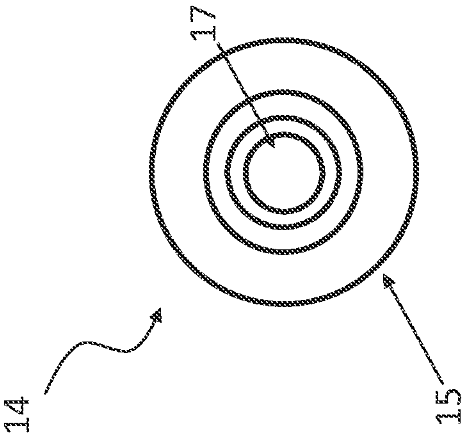
Figure 2C:
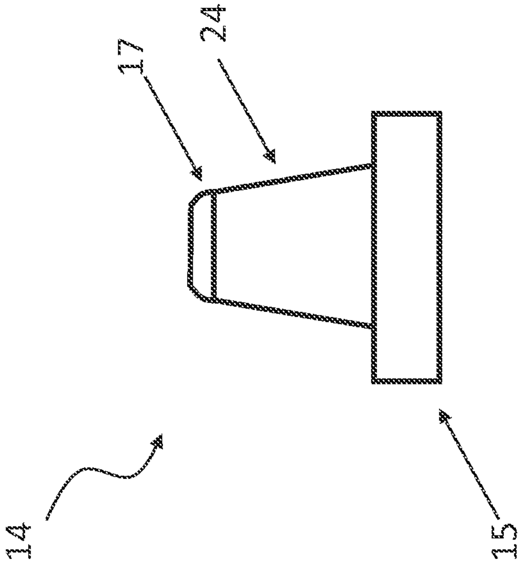
Figure 3A:
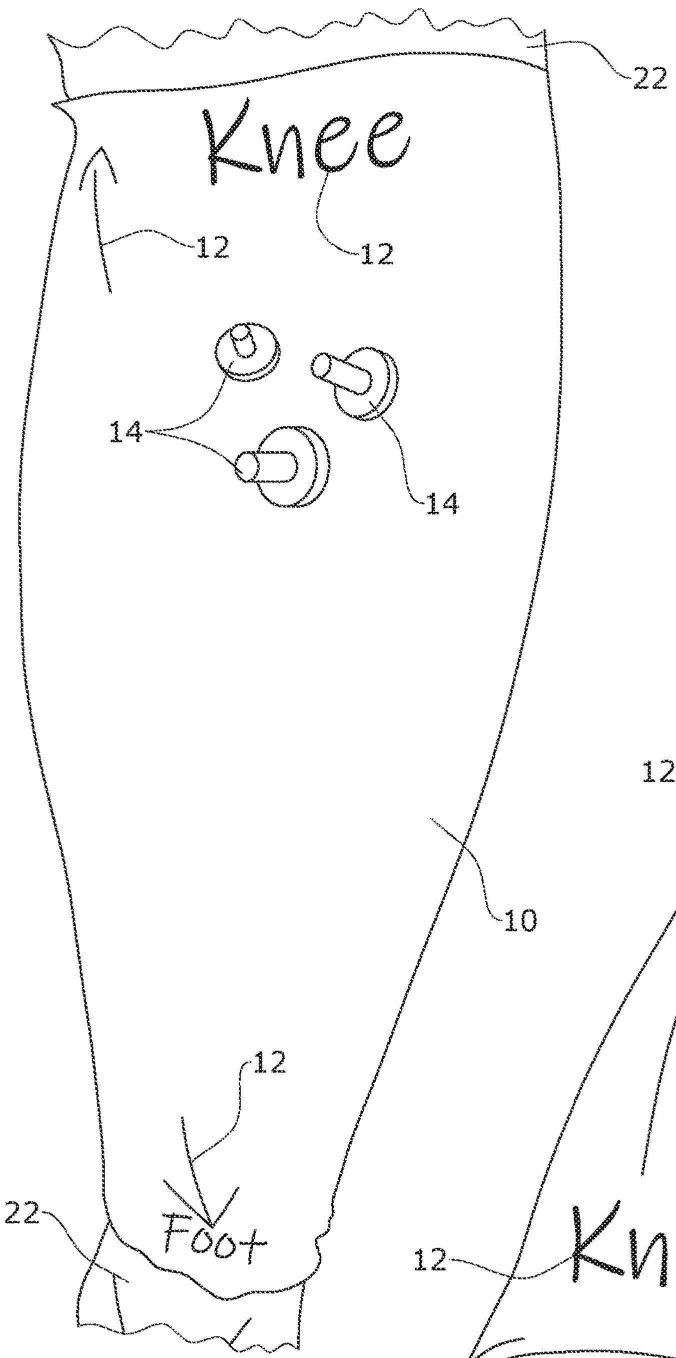
FIGS. 3A-3B illustrate another embodiment of the device.
Figure 3B:
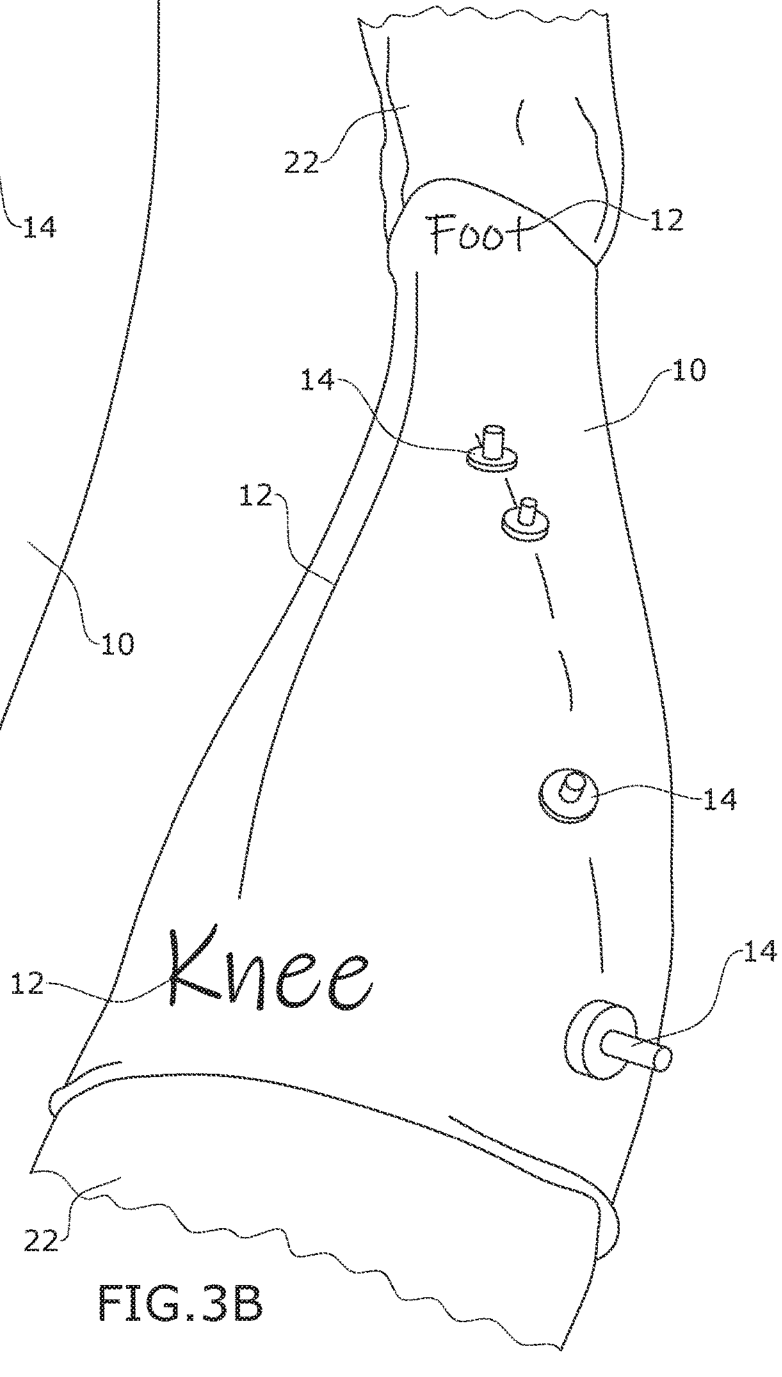
Figure 4:
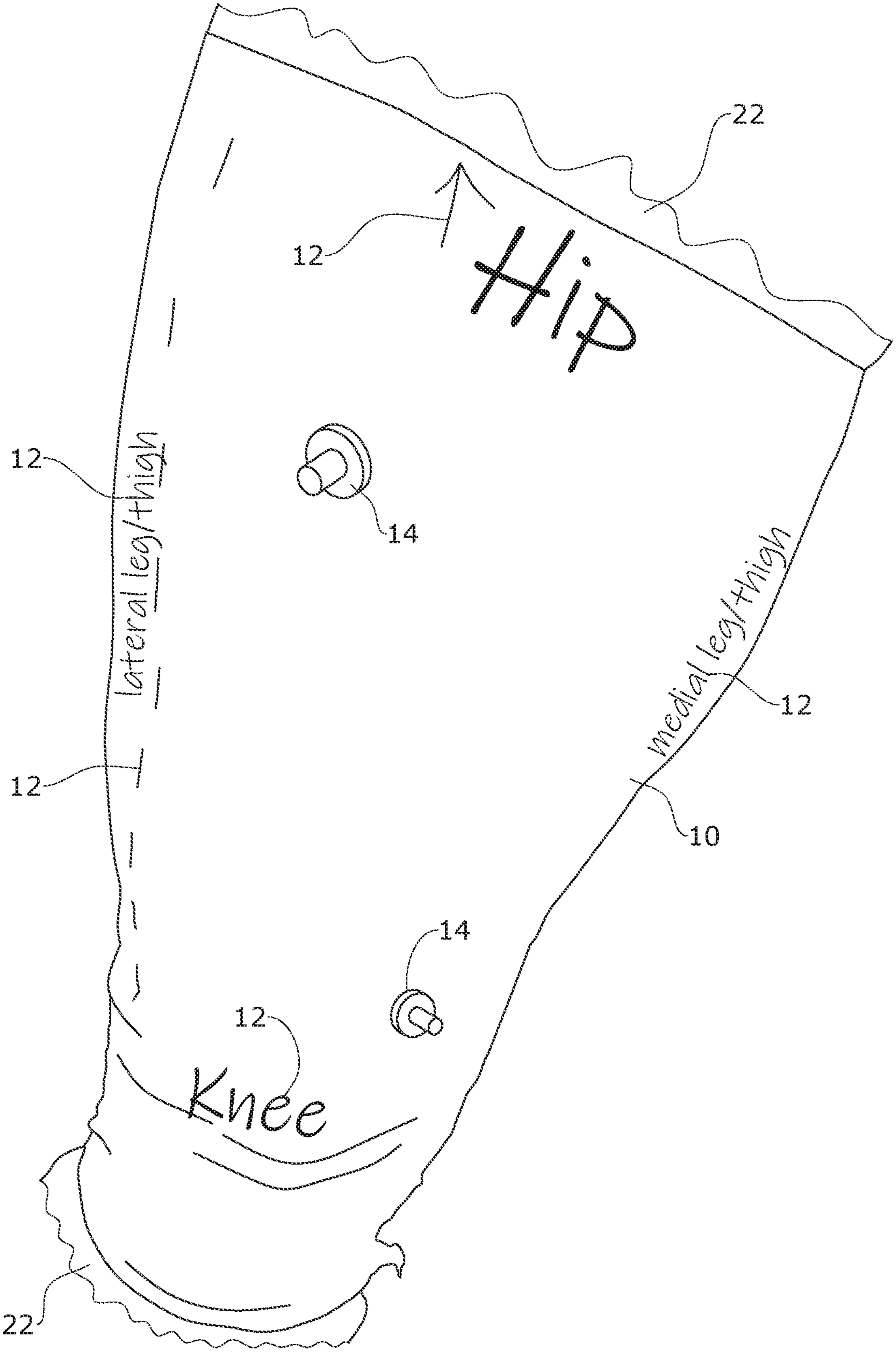
FIGS. 4-7 illustrate embodiments of the device.
Figure 5:
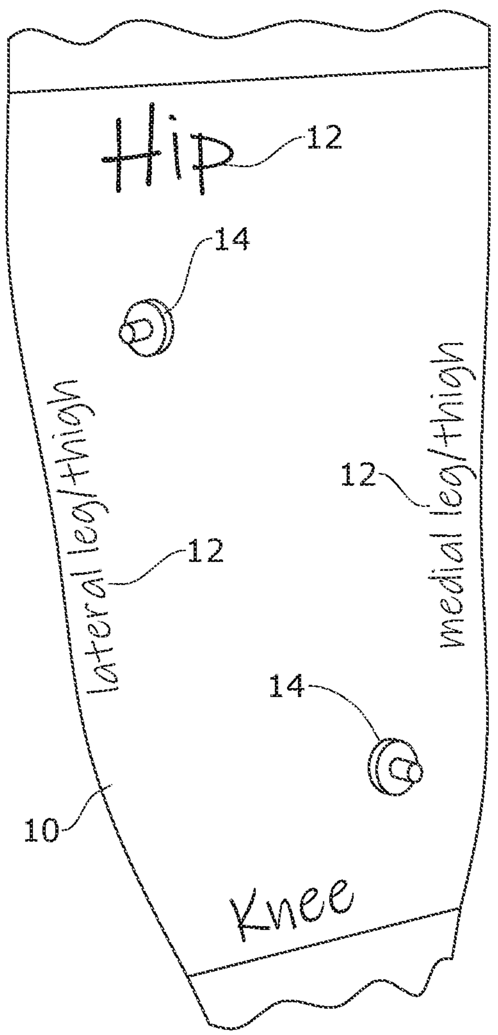
Figure 6:
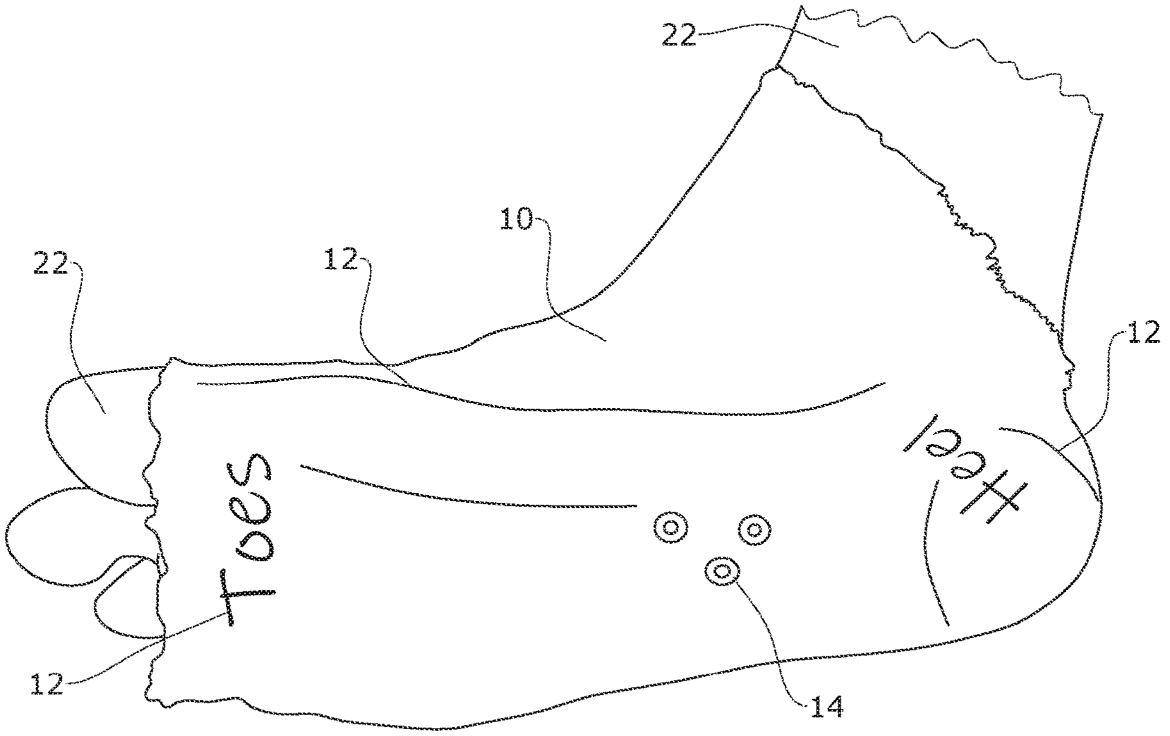
Figure 7:
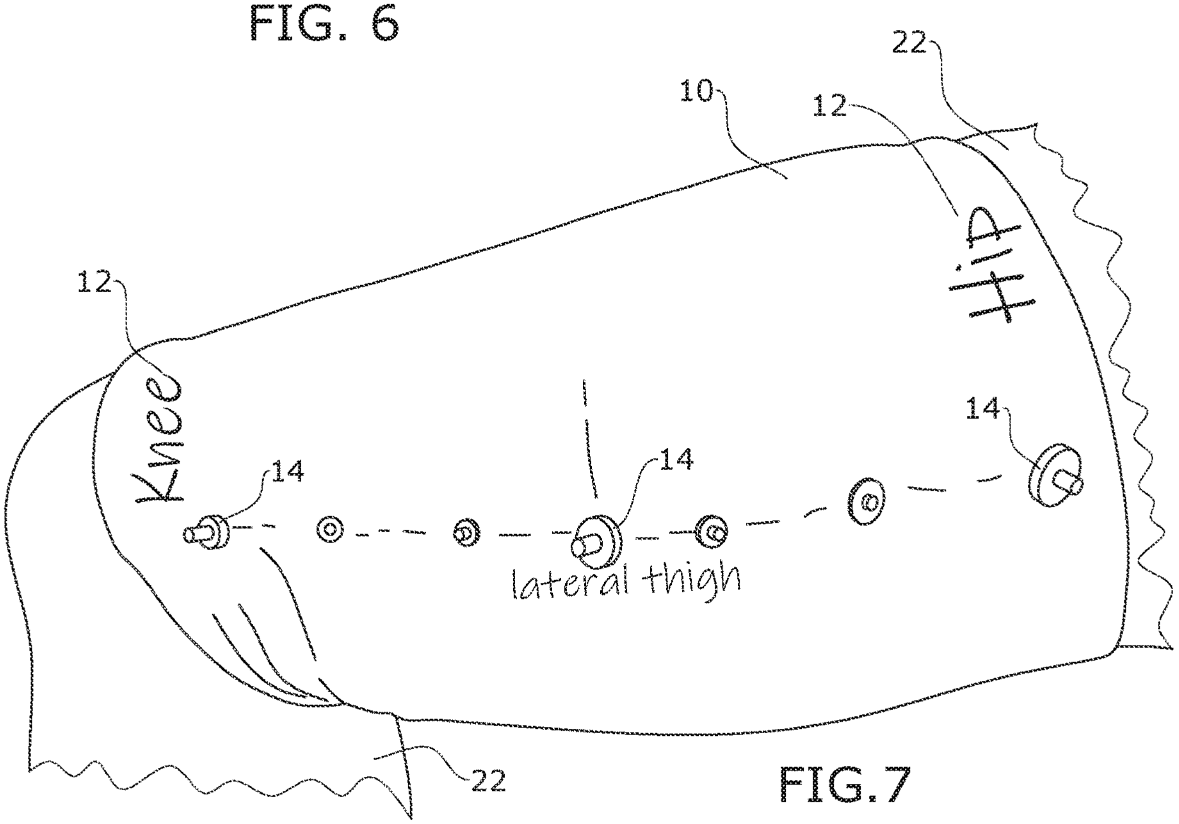

The devices described herein are to be worn by a user and provide a guide for self-needling therapy. The device is fit specifically for a user and can be selected by user based on location for use and/or by a medical professional. The alignment and orientation marks for each needle are marked on the device. Needle holders, or needle locators, are provided on a sleeve so that the user can place the needles into the holders to self-administer treatment. In additional or alternative embodiments, needle holders, needle locators or other indicators for insertion are provided with an adhesive for securing directly to a user.

The devices described herein can be provided in constructions configured for various locations on a user, examples of which include but are not limited to the forearm, shoulder (posterior, anterior, and lateral configurations), thigh (posterior, anterior, and lateral configurations), lower leg (posterior and anterior configurations), and foot. The devices described herein can further be used alone or in combination with additional treatments to address contractures and promote movement and blood flow to affected areas.

The devices described herein are not limited in use to intramuscular stimulation. Embodiments of the devices described herein can be used for reducing the appearance of scars, promoting healing and preventing the formation of scar and scar tissue in the dermal layer, subdermal layer, and/or muscle layer as the device may indicate locations of scar tissue and/or connective tissue of interest for dry needling. Embodiments of the devices described herein may also be used to treat and/or promote healing and/or reduce visible effects of hematomas and other trauma injury sites on a person as well as promote healing of surgical sites not limited to the incision(s). Embodiments of the devices described herein can further be applied to and/or proximate wounds. Embodiments of the devices described herein can further be applied to target areas comprising stretch marks. In the embodiments here, the locations for needling and needle placement correspond to the condition be addressed.

The devices described herein are effective in treating and/or minimizing intramuscular pain, muscle tone issues, stiffness, tenderness, tingling and the like. Further, the devices described herein can be used to treat neural tissue and nerves as well as the damage thereto. The needles are positioned with the devices for insertion and to stimulate neural paths and block pain receptors. Dry needling with one or more devices described herein reduces muscle tension, reduces muscle tone, may effectively treat neuromuscular pain syndromes, promote blood and promote healing as noted by any of the uses described herein. The devices described herein may be used for any treatment and/or condition in which dry needling or acupuncture. In the case of acupuncture, the needles used with the devices described herein may be a different size, however the needle guides for the devices described herein are capable of supporting needles of various sizes. It is also contemplated and within the scope of this disclosure that the devices described herein can be used in any one of the manners described with or without needle guides.

The device for each location may be provided in one or more standard sizes, including a standard size and an extra large size.

The device may comprise one series of openings for needle holders or needle guides, or a plurality of series of openings for needle holders, allowing for customizable therapy and selected therapy and options for locations for needles. The device may be comprised of a material that allows for movement of the locations for one or more needle holders or other adjustment of location thereof. The needle holders may be removable from openings in the device configured to hold the needle holders securely therein. This may also allow for selected use and position of available needle holders.

In one or more embodiments, the device may be a sleeve. What is meant by a "sleeve" is that the device is configured to surround or otherwise fit securely around a target therapy location on the user (e.g., shoulder, forearm, leg etc.). The device may be slid on to a limb or other location on the user. In one or more embodiments, the device may be a unitary construction that is flexible and resilient and may be comprised of a material with a spandex content allowing for donning and snug fit.

Additionally, or alternatively the device may be a sleeve or sheet that is configured to wrap around the target therapy location and secured thereto with one or more closures or fasteners such as a clips, clasps, ties, hook and loop fastener (e.g., Velcro®) or other means configured to allow for adjusted fit.

In one or more embodiments, the device may be a patch or series of patches. The patch or patches may or may not be used with one or more needle holders or needle guides. What is meant by a "patch" is that the device is configured to adhere directly to a target therapy location on the user (e.g., shoulder, forearm, leg, back, stomach, face, jaw, neck, joints, hip (posterior, anterior, lateral), buttocks, hands, any area of tissue damage, scaring, stretch marks, wounds, incision etc.) and have dimensions substantially the same as or having a size slightly larger than the target therapy location to surround the target therapy location and the immediate area therearound.

The device may have an adhesive side or adhesive layer which is applied in a manner to allow the patch to surround and/or cover the target therapy area and a needle being inserted through a corresponding aperture in the patch, which may or may not also hold a needle holder or guide. The adhesive may cover a perimeter of a rear surface of the patch, a portion of the rear surface of the patch or substantially all of the rear surface of the patch. Example materials for the patch may be similar to a grid tape, which is a tape formed in a grid and/or woven manner with spaced apart apertures exposing the skin below the apertures where the tape is adhered therearound; or sheets of gauze, muslin, flannel, crinoline, rubber, elastic webbing or combinations thereof with adhesive applied on at least a portion of the sheet for adhering the sheet to the user while placing the exposed gauze, muslin, or the like over a wound, incision, sensitive skin location, or trauma site. The patch or patches may have an acrylic adhesive or skin safe adhesive for securing the patch(es) to the skin, and sufficiently flexibility such that the patch is comfortable to wear but remains adhered stably in the selected location. The device and system described herein allows a user to be guided as to where and how to dry needle themselves for self-administered treatment. The user will don or otherwise apply the device to the selected body part or location suffering from pain or discomfort, needle their muscle, and resolve their pain at home. The device allows the user to dry needle one or more locations their own body, generally without additional assistance. The device has one or more openings and one or more holders or otherwise one or more indications for a needle to be inserted. The holder indicates where a user should insert a needle(s) to help resolve their pain and discomfort. There are specific locations and/or trigger points that can be needled for the fastest pain relief or comfort results and the device has one or more openings/holders configured to correspond to these specific locations when worn. In addition, there are areas that should be avoided on a user and thus, there will not be openings that correspond to such locations. This allows a user to use the device with no significant risk of injury is used according to instructions. The device allows for safe, guided, access to self-treatment and allows for pain resolution that is quicker and a lower cost in comparison to seeing a clinician.

Devices and systems according to this disclosure remove accessibility issues. The device and system allow anyone to have access to treatment. The device allows for a lower cost for the user and it allows the user to perform self-needling at any time of the day and in their own home.

In one or more embodiments, devices and systems according to this disclosure may further be used with electrical stimulation devices known in the art. The needles may optionally be connected to a source of electrical stimulation and/or pulsed stimulation to deliver electrical stimulation and/or therapy to the target therapy area on the patient. In such embodiments the device and needs are provided in a with the stimulation source and wires configured to conductively couple to the needles.

For example, to self-administer dry needling or otherwise self-needle comprises uses sanitizing wipes to clean and prep their skin. The device is applied to a selected location on the user's body. The device may fit around the selected body part and/or adhere to the selected location and may provide visual cues on it for proper placement with openings/space location for dry needles to be inserted. An instructional sheet provided with use instructions for each specific body part may be included to give the user directions on how to apply the device as well as how to insert and use dry needles. Needles are inserted into the openings of the device and into the user's muscle.

In embodiments where the device comprises one or more selectively sized patches, the patches may have a single or multi-layer construction of one or more materials. The patches may be formed in a grid pattern with material portions and spaced apart openings therein where a needle guide may be inserted or may be constructed of a material penetrable by the needles. The openings may be provided at selected locations on the patch with both the openings and the patch corresponding to a selected body part or anatomy. In one or more openings a needle holder or needle guide is retained via friction, adhesive or combinations thereof.

The patch material may comprise fabric and/or other flexible but tough and tear resistant materials. The patch(es) may have one or more layers and one or more of the layers of the patch(es) may be comprised of a fabric material of natural or synthetic materials and/or a polymer layer or silicon layer allowing the patch(es) to be washed and reused. The patches may be disposable or reusable, wherein reusable patches would be applied with a single-use adhesive layer that is easily separable from the patch itself. In other embodiments, the adhesive may be pre-applied and/or provided on one side of the patch(es). The patches are then placed on the user's skin at a location based on directions and diagrams provided with the device and specific to the target therapy location with openings in the patch aligned with target areas on the user and receiving and holding a needle holder or guide therein. The needle holder or guide may be provided within the openings and retained therein or may otherwise be insertable into the openings and retained therein.

It is also contemplated and within the scope of this disclosure that one or more patches are provided per anatomical structure, body part, muscle group(s), wound, trauma site, incision and/or surgical site, scars, scar tissue, stretch marks, sore joint, combinations thereof, and/or the like. For example, an anterior quad may be treated with a device having three or four patches for different locations in this muscle group.

It is also contemplated and with the scope of this disclosure that one or more patches may further be puncturable by the one or more needles. In one or more embodiments the patch may have a thickness provided by or more layers which serves as a needle holder. For example, the patch may be provided with a resilient but puncturable foam, where the foam may be a porous foam, having a thickness allowing the need to pierce the patch and be pushed into the skin the patch is adhered to, the thickness of the foam holding the needle in place. For example, this foam layer may be positioned on top of the adhesive layer of the patch.

Muscles that may be dry needled such as the forearm include locations for needle insertion for effective treatment of the area. The device may then have openings in this area for the needles to be inserted.

The device may be configured to fit onto a body part such as the forearm, shoulder, foot, thigh, lower leg, stomach, back, face, neck, jaw, joints, hip (posterior, anterior, lateral), buttocks, hands and may enclose or otherwise encircle the users body part. The device may provide a snug fit and may be provided in multiple sizes to select from, for example, a "one size fits most" and an "extra-large size" tailored for the contours and general anatomy of selected body parts including but not limited to those noted above. The user may wear the device and ensure sufficient placement for use with directions provided for correct placement. The device may be secured on the user via fasteners such as clips, hooks, clasps, hook and loop fastener or the device may comprise an elastic material in a content sufficient to allow the device to be slid on to the user and retained safely in place once worn and resistance to unintentional movement of the device.

Once the device is worn, the user may follow the instructional sheet on how to use dry or acupuncture needles and where to place the needles (the device helps to guide the user on where to place the needles based on the condition be addressed). The device may have an opening/space with a needle holder that allows the user to insert the needle in the correct location and perform self-treatment. The device may have one or more specific openings/locations to insert the needle to effectively treat the body/muscle. Prior to donning the device, the user may prep their skin with a sanitation wipe to ensure it is clean.

The device may be able to fit most users and when the device is a sleeve is able to expand but also fit snugly on or around a user's body part. The device supports one or more needle holders which act as a need guide for insertion of dry needles. The needle holder(s) may hold the needle vertically, and have an opening so the needle may then penetrate the user for insertion into the muscle of the user at a location identified by the location of the needle holder. The device is configured for use and to help guide the user on the best location to insert a needle.

To use this device wherein the device comprises a sleeve, the device needs to fit onto one's body part, and a user may then follow the instructions for use and use the needles for treatment. In embodiments where the device comprises one or more patches, the patches are adhered to the locations of the target therapy. The device helps guide the user on best location of needle placement.

FIGS. 1-7 illustrate a sleeve 10 for wearing by a user and components. The sleeve 10 illustrated in worn on a limb 22. The sleeve comprises orientation or alignment marks 12 and a plurality of needle locators 14 which also act as holders for needles 16. In use a sanitizing wipe 18 is provided for cleaning the limb 22 prior to donning the sleeve 10 and instructions 20 for use may also be provided.

The needle locator 14 may generally be a port having a first end 15 for coupling to or otherwise being held by a location in the sleeve 10. The sleeve 10 may be provided with openings which frictionally engage the first end 15 of the needle locator 14. Alternatively, the first end 15 may have a lip or other ring which is provided between layers of the sleeve 10 construction or is otherwise sewn in or adhered to the sleeve 10. Further, the needle locator 14 may have a multi-piece first end 15 which allows the sleeve 10 to be secured between a lower and upper connection on the first end 15 as shown by the embodiment in FIG. 2B. In some embodiments, the sleeve 10 may hold the lip or ring of the first end 15 of the needle locator between the user's skin and the sleeve 10. The needle locators 14 may be removable for washing of the locators 14 and/or sleeve or may be permanently secured to the sleeve 10. A second end 17 of the needle locator 14 is configured for removably receiving the needle 16 and directing the needle into the location on the user. The needle locator 14 has an interior opening for directing and holding the needle. The needle locator 14 also has a length 24 there along which can prevent the needle 16 from excessive movement or dislodgement when the needle 16 is inserted into the user through the needle guide 14 and corresponding opening in the sleeve 10. The sleeve 10 thus allows a user access to selected guided locations with the needle 16 and retain the needles in the user's skin for a therapeutic effect.

Figure 8:
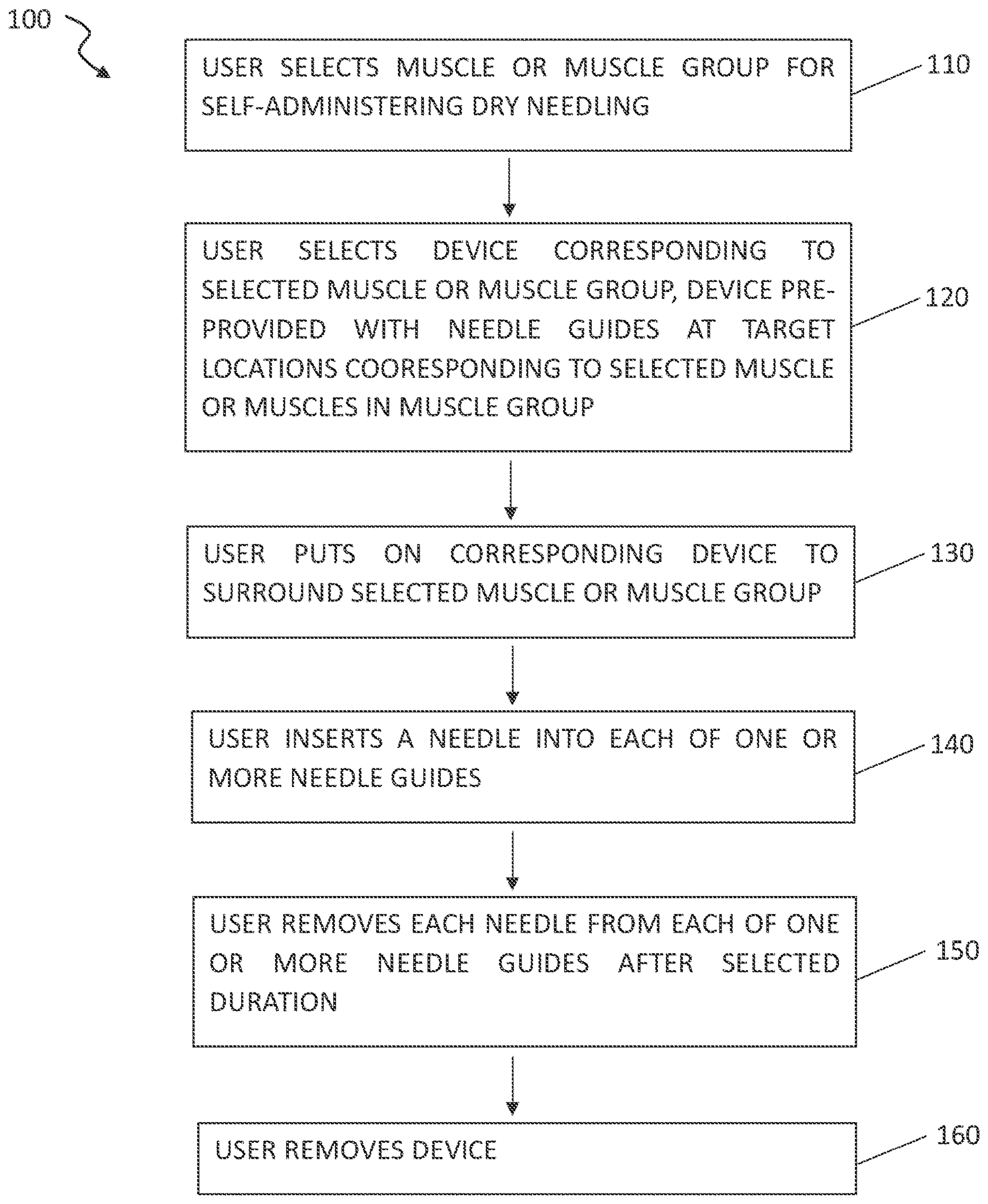
FIG. 8 is a flow chart of a method of using a device according to one or more embodiments described herein.

FIG. 8 illustrates one embodiment of a method 100 for self-administering dry needling therapy. For example, a user selects a muscle or muscle group for self-administering dry needling (110). The user then selects a device having dimensions and needle locator ports corresponding to the selected muscle(s) or muscle group (120) and puts on the corresponding device (130) to cover or surround the selected muscle(s) or muscle group. For example, when ready to dry needle, the user may sanitize the area first and then put the device on their limb or body. The user then inserts a needle through each of the one or more needle guides and into the selected muscle below the needle guide (140). The use may insert and then immediately remove the needles, allowing the needle to momentarily penetrate the muscle or may leave the inserted needle in the needle guide and in the muscle for a period of time ranging from about 1 second to about 10 minutes, or for example for about 4 minutes to about 8 minutes, or about 5 minutes, to achieve a therapeutic effect. The user then removes the device (160).

Figure 10:
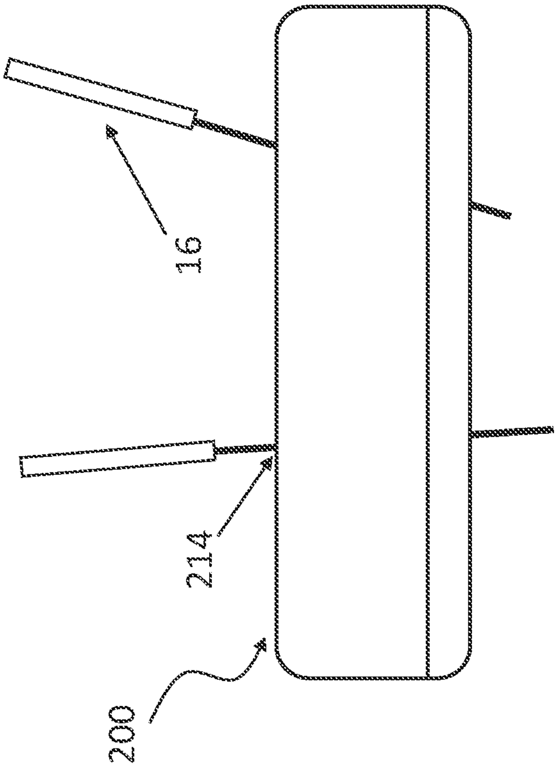
FIG. 10 is a side view of another device according to one or more embodiments described herein.
Figure 9:
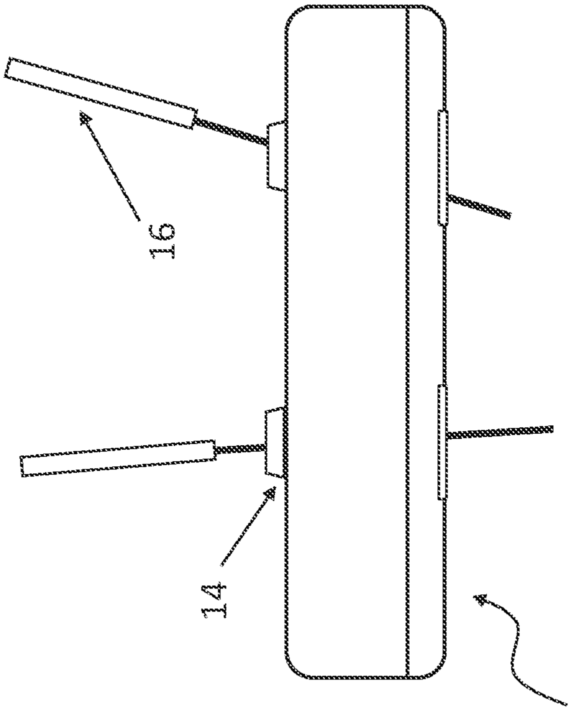
FIG. 9 is a side view of another device according to one or more embodiments described herein.

FIGS. 9-10 illustrate a device comprising one or more patches 200 which may be of a single or multi-layer construction and which have varying thicknesses. The needle locator(s) 14 may be used with the patch(es) 200 as shown in FIG. 9. As shown in FIG. 10, the patch(es) 200 may have a thickness and construction provided with a visual indicator 214 that serves as a needle locator 14 and the construction of the patch itself providing support for needles inserted therethrough.

Figure 11B:
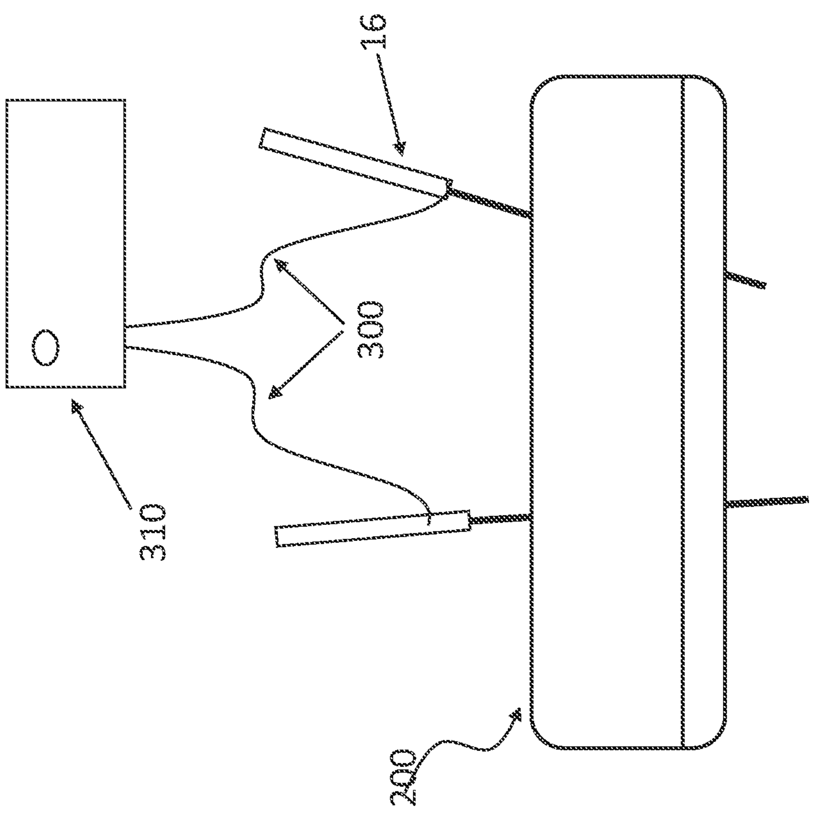
FIGS. 11A-11B illustrate a kit comprising a device according to one or more embodiments described herein in connection with a source of electrical stimulation pulses.
Figure 11A:
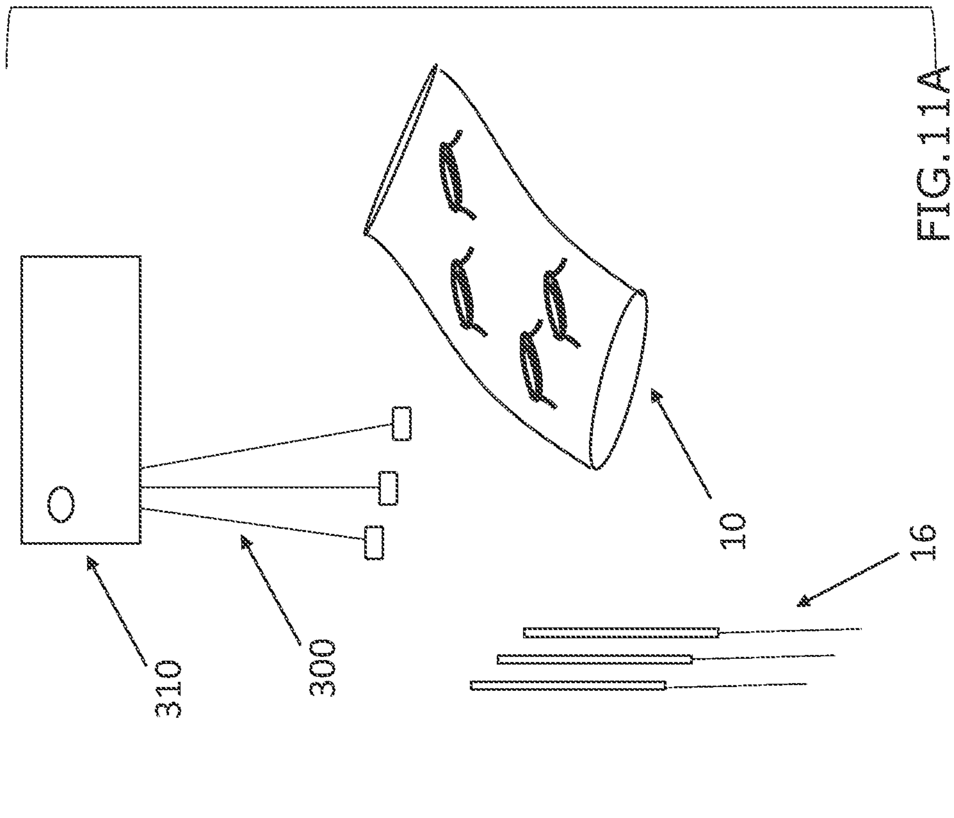

FIGS. 11A-11B illustrate a kit wherein the device of any one of the embodiments described herein is used with electrical stimulation via wires 300 connected to an independent source of electrical stimulation 310.

Although the present disclosure has been described with reference to preferred embodiments, workers skilled in the art will recognize that changes may be made in form and detail without departing from the spirit and scope of the disclosure.

The invention claimed is:

1. A system for self-needling comprising:

a flexible device comprising a surface area configured to surround a location on a user and a thickness configured to support a plurality of directional needle guides therein, a plurality of openings in the thickness of the surface area, each opening of the plurality of openings supporting a directional needle guide of the plurality of directional needle guides therein, wherein the plurality of openings and the plurality of needle guides are each configured to allow a needle to pass therethrough to the location on the user;

wherein the flexible device comprises a first material and the plurality of needle guides comprises a second material, different from the first material; and a plurality of needles wherein one needle of the plurality of needles is configured for removable insertion within each of the directional needle guides.

2. The system of claim 1 wherein the surface area comprises a flexible material, fabric, or plastic and is configured to removably surround the location on the user.

3. The system of claim 2 wherein the surface area is a sleeve configured to surround an arm, leg, or other appendage of the user.

4. The system of claim 3 wherein the sleeve is custom fit to the user and the locations of each of the plurality of openings are custom positioned.

5. The system of claim 1 wherein the plurality of openings in the surface area correspond to a plurality of muscle locations on the user such that when one of the plurality of needles is inserted into each of the plurality of directional guides, the one needle of the plurality of needles is in a position to penetrate the user into the muscle tissue.

6. The system of claim 1 wherein the user is able to self-administer each of the plurality of needles.

7. The system of claim 1 and further comprising a source of electrical stimulation in wired connection with at least one of the plurality of needles configured to fit within each of the plurality of directional needle guides.

8. The system of claim 1 wherein the surface area is a patch configured to surround a muscle group of an arm, leg, or other appendage of the user.

9. The system of claim 1 wherein the plurality of directional needle guides each comprises a surface to frictionally engage the one needle of the plurality of needles, ring, a grommet or combinations thereof.

10. A method for self-administering therapeutic needling comprising:

donning a flexible device on a selected location on a user; and inserting a first needle through a first needle guide held by a first aperture in a thickness of the flexible device and into a selected muscle positioned therebelow;

inserting a second needle through a second needle guide held by a second aperture in the thickness of the flexible device and into a second location on the selected muscle positioned therebelow, wherein the first and second needle guides are secured to one or more target locations on the flexible device and wherein the one or more target locations correspond to one or more locations on the selected location of the user, and wherein the flexible device has dimensions specific to hold the flexible device and the portions of the first and second needle guides thereof on the one or more locations on the user while inserting the first and second needles through the first and second needle guides and into the selected muscle there below.

11. The method of claim 10 and further comprising obtaining a second and/or subsequent flexible devices, wherein each of the flexible devices has dimensions configured for application to a specific, different location on a user, and inserting needles through corresponding needle guides therein of the second and/or subsequent flexible device.

12. The method of claim 10 wherein the flexible device and the needle guides are comprised of different materials.

13. The method of claim 10 wherein the one or more target locations correspond to a muscle or muscle group, scar or scar tissue, incision site, wound, a dermal trauma injury, a neural tissue trauma injury, muscular trauma injury, contracture, stretch marks, connective tissue, joint, or combinations thereof and further comprising leaving the first and/or second needles inserted in the selected muscle through the device and protecting the first and/or second needles from unintentional movement or dislodgement by an upright surface of the device.

14. The method of claim 13 and further comprising leaving the first and second needles inserted for a selected period of time ranging from about 1 second to about 10 minutes.

15. The method of claim 10 and further comprising electrically coupling a source of electrical stimulation to the first and second needles and providing electrical stimulation to the one or more target locations while the first and second needles are inserted therein.

16. A system for dry needling or acupuncture comprising:

a multi-layer flexible device comprising one or more surface areas configured to attach to a selected location on a user, a plurality of openings through the device, each opening of the plurality of openings configured for supporting a needle passing therethrough and into the selected location on the user; and an adhesive layer on the device configured to removably secure the device to the selected location on the user;

wherein the multi-layer flexible device comprises a first material that is a foam material, and wherein the plurality of openings each form a port for directing the needle removably passing therethrough, and wherein each of the plurality of openings comprises a second material different from the first material, and wherein the selected location corresponds to a muscle or muscle group, scar or scar tissue, incision site, wound, a dermal trauma injury, a neural tissue trauma injury, muscular trauma injury, contracture, stretch marks, connective tissue, joint, or combinations thereof.

17. The system of claim 16 wherein the plurality of openings in the one or more surface areas are ports designed to frictionally engage a location on a needle inserted therethrough and hold the needle inserted therethrough and into the selected location on the user.

18. The system of claim 16 and further comprising a source of electrical pulses and one or more wires for electrically coupling the source of electrical pulses to the needle inserted into the selected location on the user for providing electrical stimulation to the selected location.

19. The system of claim 16 wherein the flexible device is a single use flexible device.

* * * * *